United States Patent [19]

Whelan

[11] E Re. 29,590

[45] Reissued Mar. 21, 1978

[54] APPARATUS FOR RADIATION-CURING OF COATING ON MULTI-SIDED OBJECT

[75] Inventor: Edward J. Whelan, Hasbrouck Heights, N.J.

[73] Assignee: Sun Chemical Corporation, New York, N.Y.

[21] Appl. No.: 607,606

[22] Filed: Aug. 25, 1975

Related U.S. Patent Documents

Reissue of:

[64] Patent No.: 3,840,999
Issued: Oct. 15, 1974
Appl. No.: 360,656
Filed: May 16, 1973

[51] Int. Cl.[2] ..... G21G 4/00; F27B 9/24

[52] U.S. Cl. ..... 250/493; 34/1; 34/105; 34/236; 219/388; 432/121; 250/504

[58] Field of Search ..... 250/493, 503, 504, 453, 250/454, 455; 34/105, 236, 1; 432/121, 122, 124, 162; 219/388

[56] References Cited

U.S. PATENT DOCUMENTS

| | | | |
|---|---|---|---|
| 2,596,800 | 5/1952 | Webb | 34/105 |
| 3,365,158 | 1/1968 | Dowling | 198/131 |
| 3,420,468 | 1/1969 | Rhoades | 211/59 |
| 3,438,138 | 4/1969 | Bachrach | 34/236 |
| 3,530,294 | 9/1970 | Rogers | 250/453 |
| 3,627,282 | 12/1971 | Kinslow | 432/11 |
| 3,664,188 | 5/1972 | Kockott | 250/453 |
| 3,715,109 | 2/1973 | Gilbert | 432/122 |
| 3,733,709 | 5/1973 | Bassemir | 34/1 |
| 3,740,868 | 6/1973 | Moore | 34/105 |
| 3,771,948 | 11/1973 | Matsumiya | 432/122 |

*Primary Examiner*—Craig E. Church
*Attorney, Agent, or Firm*—Cynthia Berlow

[57] ABSTRACT

Apparatus for ultra-violet light curing by photopolymerization of radiation free ink or coating material, which is coated on the peripheral surfaces of a multisided rotatable object: each uncured ink coated object is positioned on a rigid or resilient support at the end of a respective mandrel; the mandrels are rotatably journaled to an endless belt, or the like, which moves the mandrels and the objects supported thereon through a radiation oven; each mandrel carries a wheel, which engages a rack that is oriented parallel to the pathway of the mandrels through the oven such that the mandrels and the objects they support are rotated as they move along the path through the oven; a radiation emitting lamp in the oven is in a plane that is spaced from the axes of the objects as they move through the oven and is generally parallel to the path of movement of the objects through the oven; the lamp is oriented obliquely to the direction of extension of the mandrels and the objects as they pass through the oven to cause uniform radiation impingement along the length of each object on its mandrel. A battery of ovens may be provided through which the objects pass successively.

17 Claims, 10 Drawing Figures

3
2
43B
20
12
12
16
14
26
74
78
70
92
90
76
93
50
72
60
A
24
30
32
28
22
43A
10

16
14
36
20
74
50
76
60
70
90
96
93
42
40
72
A
43A
10

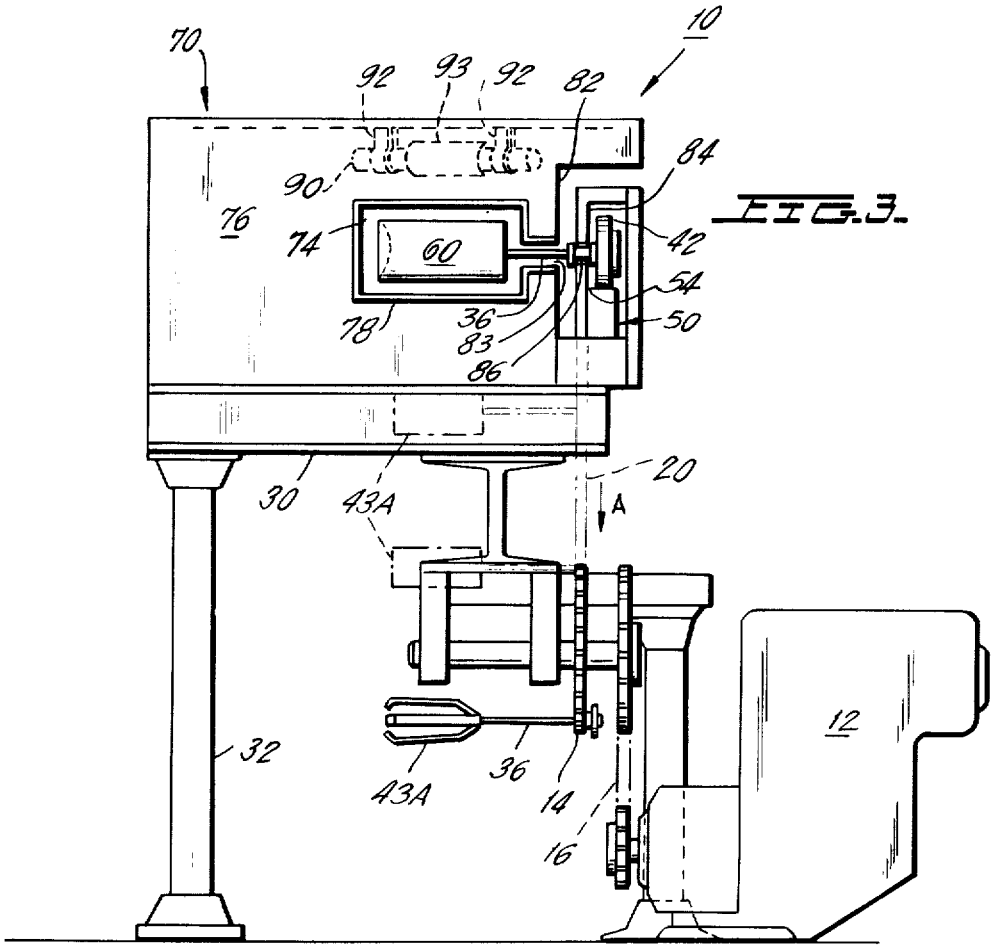
FIG. 3.
FIG. 4.
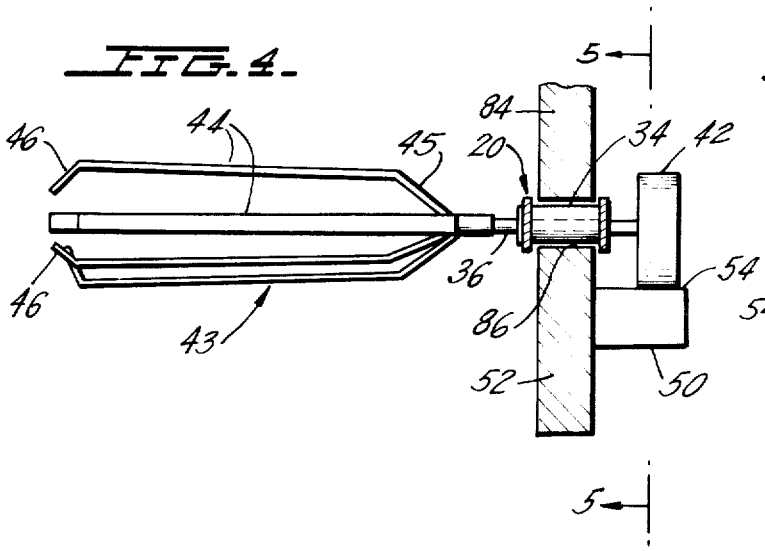
FIG. 5.
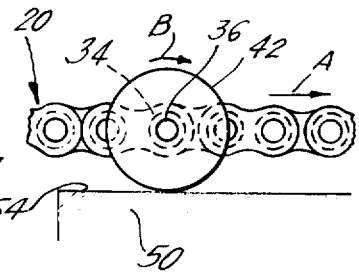

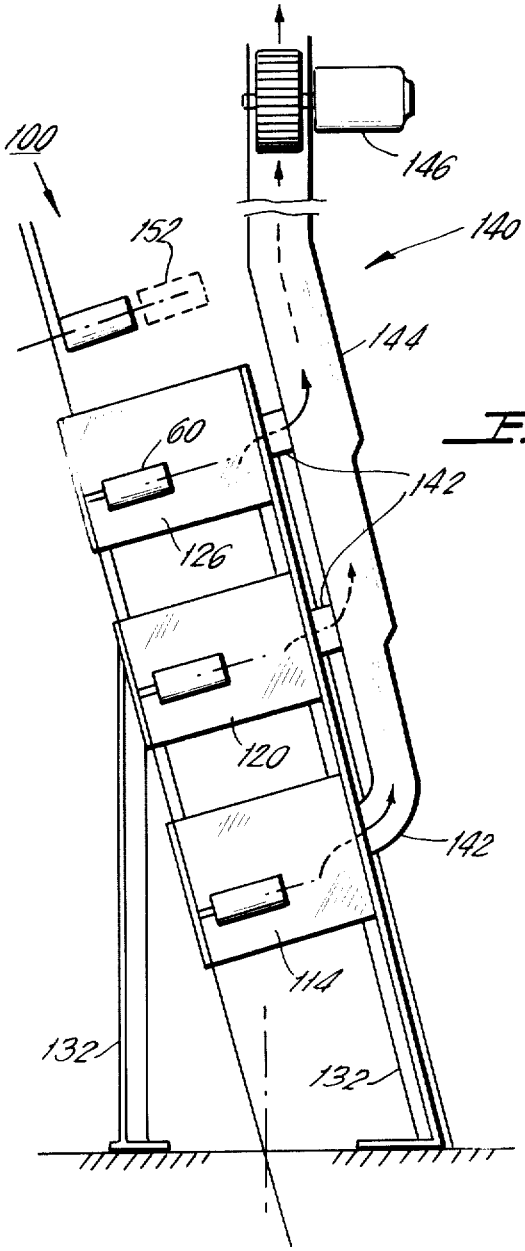
FIG. 7.
FIG. 10.
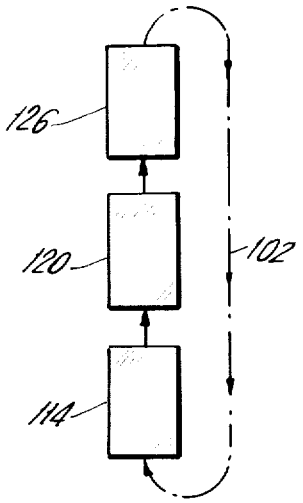
FIG. 8.
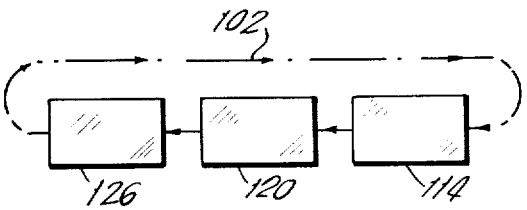
FIG. 9.
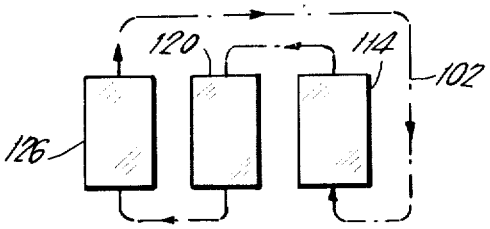

APPARATUS FOR RADIATION-CURING OF COATING ON MULTI-SIDED OBJECT

Matter enclosed in heavy brackets [ ] appears in the original patent but forms no part of this reissue specification; matter printed in italics indicates the additions made by reissue.

BACKGROUND OF THE INVENTION

This invention relates to apparatus for curing solvent-free materials that have been applied to the peripheral surfaces of a multi-sided, e.g. cylindrical or the like body. Apparatus for radiation curing solvent-free materials that have been coated on one surface of an object is taught in application Ser. No. 342,816 filed Mar. 19, 1973 now U.S. Pat. No. 3,826,014. The present invention is for curing solvent-free materials that have been coated on the peripheral surfaces of an object where the surfaces face outwardly in different directions. Curing of the coatings requires that the various coated surfaces of the object be exposed to the radiation. The invention is particularly applicable to solvent-free coatings or inks applied to cans or the like containers, but it is not limited to such use.

Solvent-free inks and other solvent-free coatings are increasingly utilized in industry, particularly because use of such material minimizes air pollution resulting from the curing of solvent bearing inks and coatings. High speed curing of solvent-free material is accomplished with high power ultra-violet radiation, which is directed at the solvent free material after its application. Apparatus for accomplishing such curing uses considerably less energy than conventional gas ovens.

An apparatus which may be used for applying solvent-free material coatings to an object is shown in application Ser. No. 198,618 filed Nov. 15, 1971, now U.S. Pat. No. 3,766,851. Once the coating has been applied to the object, the object is placed onto the curing apparatus of the invention.

With cans, or the like objects, having plural outwardly facing sides about their peripheries, the coating to be cured has been applied to surfaces facing outwardly in various directions. The curing apparatus must be adapted to cure the coatings on all of the outwardly facing surfaces.

SUMMARY OF THE INVENTION

In accordance with the invention, multi-sided objects carrying a coating or ink to be cured are moved in succession along a pathway through a curing oven in which an ultra-violet radiation emitting curing lamp is positioned. The lamp radiates principally in one direction. The objects are rotated around their axes as they move through the oven so that radiation will impinge upon all of their peripheral surfaces.

For each object bearing a coating to be cured, a supporting mandrel is provided. Moving means are connected with the mandrels for so moving them as to move the objects they support in succession along the pathway through the curing oven. Means are provided for rotating the objects as they pass through the oven, e.g. by rotating the mandrels. For this purpose, the mandrels are journaled on the mandrel moving means.

Each mandrel carries a mandrel rotation wheel. A rack extending at least the length of the pathway through the oven and oriented generally parallel to that pathway is engaged or contacted by the mandrel wheels as the objects are moved by the mandrels through the oven. This rotates the objects as they pass through the oven.

The axis of each object is oriented along the mandrel. In order to obtain proper curing, the entire length of the object along its axis should be exposed to uniform radiation. To accomplish this, the radiation emitting lamp or lamp assembly is arranged in a plane that is spaced from the axes of the mandrels as the mandrels move the objects through the oven and that is generally parallel to the path of the objects through the oven. Furthermore, the lamp is oriented obliquely with respect to the path of the objects and with respect to their axes so that as the objects move along the path, the radiation impinges across each object along its axis.

Each of the objects bearing a coating to be cured is connected to its mandrel. With cans or the like hollow objects, it is preferred to pass the mandrel into the object. As the mandrel and the hollow interior of the object may not be aligned before the object is mounted and as it is necessary that the mandrel securely engage the object to cause its rotation, the support portion of the mandrel, which is the portion that is received in the hollow interior of the object and engages the walls surrounding the interior of the object, may be comprised of resilient material. The support portion deflects as the object is forced over it, so that the mandrel can fit within the object. The support portion is resilient also so that it will be biased outwardly against the interior walls of the object to hold the object securely and enable the mandrel to rotate the object. In a particular embodiment of the invention, the mandrel support portion for the object is comprised of a plurality of resilient fingers. In some applications, the support portion may be rigid and nondeflectable.

It is the primary object of the present invention to provide improved photopolymerization means for curing solvent-free coatings.

It is another object of the invention to apply radiation to cure solvent-free coatings on plural sided objects.

It is yet aother object of the invention to provide an apparatus for curing solvent-free coatings on cans, or the like objects.

These and other objects of the present invention will become apparent from the following description of the accompanying drawings.

BRIEF DESCRIPTION OF THE DRAWINGS

FIG. 3 is an end elevation view of the apparatus of FIG. 1 viewed in the direction of arrows 3 in FIG. 1;

FIG. 4 is an enlarged fragmentary view of a portion of the apparatus illustrated in FIG. 3, specifically illustrating the manner of mounting and moving the objects bearing a coating to be cured;

FIG. 5 is a view in the direction of arrows 5 in FIG. 4 showing the means for rotating the mandrel;

FIG. 7 is a side view of the apparatus of FIG. 6; and

FIGS. 8-10 are schematic views of variations of the embodiment of FIG. 6.

DETAILED DESCRIPTION OF A PREFERRED EMBODIMENT

Figure 1:
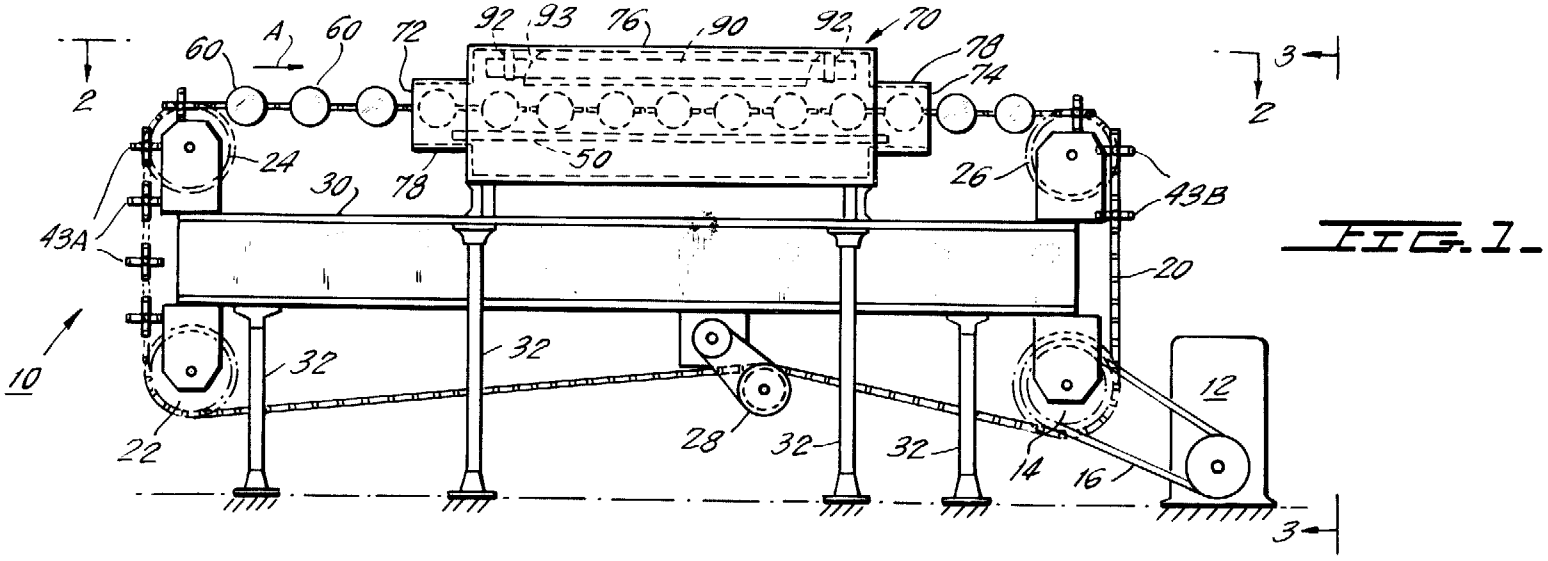
FIG. 1 is a side elevation assembly view of a complete curing apparatus in accordance with the invention.
Figure 2:
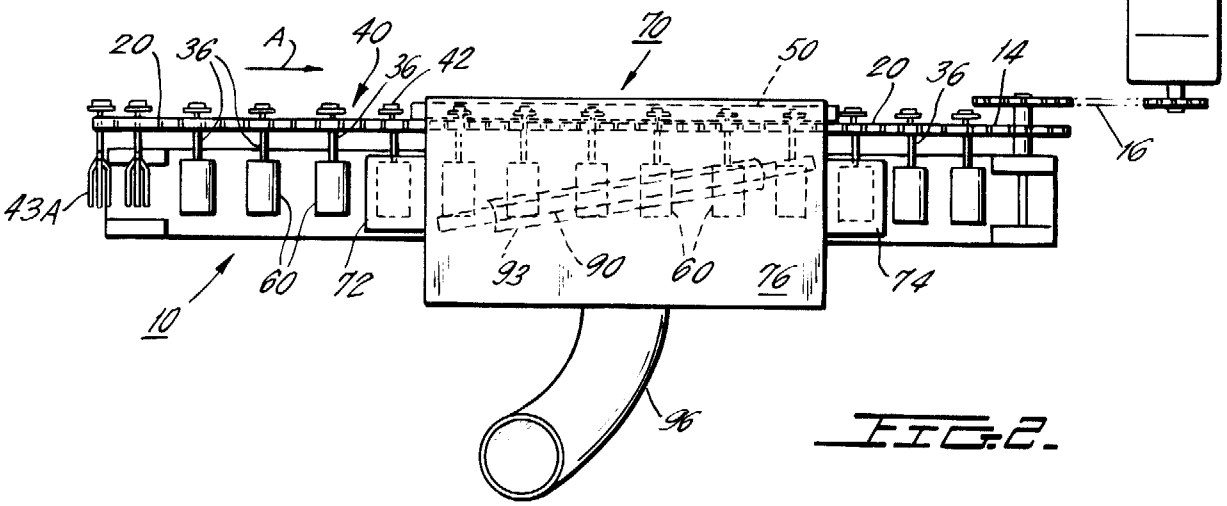
FIG. 2 is a top view of the apparatus of FIG. 1 viewed in the direction of arrows 2 in FIG. 1.

Turning to FIGS. 1-3, curing apparatus 10 includes conventional motor 12, which conventionally drives main drive gear 14 through belt 16. Passing around gear 14 and in driving engagement therewith is main belt or chain 20, which moves cans 60 through curing oven 70, as described below. Chain 20 passes around conventional rotating idlers 22, 24, 26 and slack reducing idler 28, which idlers define the generally rectangular path followed by chain 20. Gear 14 and the idlers are all rotatably mounted in supporting brackets on support frame 30. Frame 30 is supported by posts 32. As gear 14 rotates clockwise in FIG. 1, chain 20 moves lengthwise in the clockwise direction and all cans 60 carried on chain 20 are moved in the direction of arrow A in succession through oven 70.

Referring to FIGS. 4 and 5, chain 20 is a plural link bicycle type chain. Gear 14 is a conventional toothed sprocket adapted to engage in chain 20. At predetermined spaced intervals along chain 20, the usual pivoting posts of the links of the chains are replaced by bushings 34 each having a clearance opening through which passes shaft 36 of can supporting mandrel 40. By means of this connection, each mandrel 40 is journaled to chain 20 to permit rotation of shafts 36, as described below.

Rigidly fastened to the end of each shaft 36 is friction surface wheel 42, which engages with cooperating friction rack 50 for rotating wheel 42. At the other end of mandrel 40 from wheel 42 is a resilient can support 43 comprised of a plurality of fingers 44 radiating away from junction 45 toward their inwardly directed outer end portions 46. The resilient fingers are deflectable to be readily inserted into can 60 if support 43 and the interior walls of can 60 are misaligned. The fingers resiliently deflect outwardly to engage the interior walls of can 60 so that rotation of mandrel 40 also rotates the can. As an alternative to resilient fingers, a resilient bristled brush may be employed.

In some applications, a resilient support is not needed. Fingers 44 could thus be rigid.

Rack 50 is comprised of a flat wheel engaging surface 54. Mandrel wheel 42 may alternatively be toothed and a plurality of spaced, tooth receiving posts would then be substituted for surface 54. As chain 20 moves in the direction of arrow A and wheel 42 engages rack 60, each mandrel wheel 42 and, therefore, its mandrel 40, can support 43 and can 60 all rotate around their respective axes in the direction of arrow B facilitating uniform impingement of radiation upon the peripheral surfaces of can 60 to cure the solvent-free coating thereon.

Referring to FIGS. 1 and 2, can supports 43A are moved by chain 20 in the direction of arrow A toward the entrance to curing oven 70. After supports 43A pass around idler 24, a conventional apparatus (not shown) delivers cans 60 to the supports by sliding the cans, open end first, over fingers 44. The cans have had a solvent-free coating previously applied to them by apparatus (not shown) and are now ready for curing in oven 70.

Turning to FIGS. 1-3, oven 70 has an entrance 72 and an exit 74 between which is substantially hollow enlarged housing 76. Both entrance 72 and exit 74 are narrowed generally to the size of the cans or other objects which are to be passed through the oven, so as to minimize the escape of dangerous ultra-violet radiation from housing 76.

There are entrance and exit vestibules 78, which are narrowed to conform to the shape of entrance and exit openins 72, 74. The vestibule walls serve as radiation baffles further reducing escape of radiation.

As shown in FIG. 3, while the can 60 travels its path between the entrance and exit through oven 70, mandrel wheel 42 and rack 50 are external to housing 76 so as to facilitate servicing them and to minimize their being needlessly exposed to possibly damaging radiation. The vestibules 78, the entrance and exit sides of housing 76 and the side wall 82 of housing 76 are all provided with narrow slot 83 to permit mandrel shaft 36 to pass through oven 70 while minimizing the escape of radiation from the oven. In addition, protective baffle plate 84 is interposed between oven housing wall 82 and mandrel wheels 42 and rack 50 to absorb radiation, which exits through slot 83. Wall 84 has a quite narrow slot 86, which guides chain 20 past housing 70 and thereby more precisely guides the movment of cans 60 through curing oven 70.

Rack 50 is positioned outside and supported on housing 76 and oven 70 and is oriented parallel to the pathway of cans 60 and mandrels 40 as the cans 60 move through oven 70. Rack 50 is of a length sufficient to cause cans 60 to rotate during the entire period they are within housing 76 and being exposed to radiation.

Within housing 76 is positioned the ultra-violet radiation emitting lamp 90. It has terminals 92 which are conventionally electrically connected by means (not shown) to a conventional electric power supply and which support the lamp 90 at the top of housing 76. A reflector 93 may be positioned behind lamp 90 to focus radiation on cans 60 passing through oven 70.

Lamp 90 is oriented to maximize and to uniformly and efficiently distribute radiation over the entire peripheral surfaces of cans 60 as they rotate while passing through oven 70. Lamp 90, being at the top of housing 76, is spaced from cans 60 and their respective mandrels 40. The lamp is also arranged in a plane spaced from the cans. Preferably, for uniform radiation, the plane of lamp 90 is generally parallel to the path of the cans through housing 76. As shown in FIG. 2, lamp 90 is oriented obliquely with respect to the path of cans 60 through housing 76 and the axes of cans 60 so that as the cans move through the housing, the intense focused radiation of lamp 90 impinges upon the entire length of each can along is axis and along its mandrel 40.

Although only a single lamp 90 is illustrated, a plurality of lamps may be used and they should be arranged for uniform radiation impingement. An additional lamp may be positioned below the cans 60.

The intense radiation from lamp 90 generates ozone in the vicinity of the lamp and greatly heats the air in enclosed housing 76. A conventional exhaust means (not shown) exhausts heated air and ozone from within housing 76 through outlet conduit 96. The air flow through the housing from entrance 72, exit 74 and the side wall slot 83 cools heated lamp 90 and removes heated air and ozone from housing 76.

After cans 60 have moved through oven 70 and the coating thereon has been cured, the cans 60 are removed from their supports 43B by conventional means (not shown). Chain 20 continues to move around and additional cans 60 are mounted on the mandrels and move through oven 70.

There has just been described one embodiment of apparatus for curing radiation-free coating material on cans, or the like multi-sided objects by rotating the cans as they pass through the curing oven and are cured by radiation impinging from one side of the oven toward the objects passing through the oven.

Figure 6:
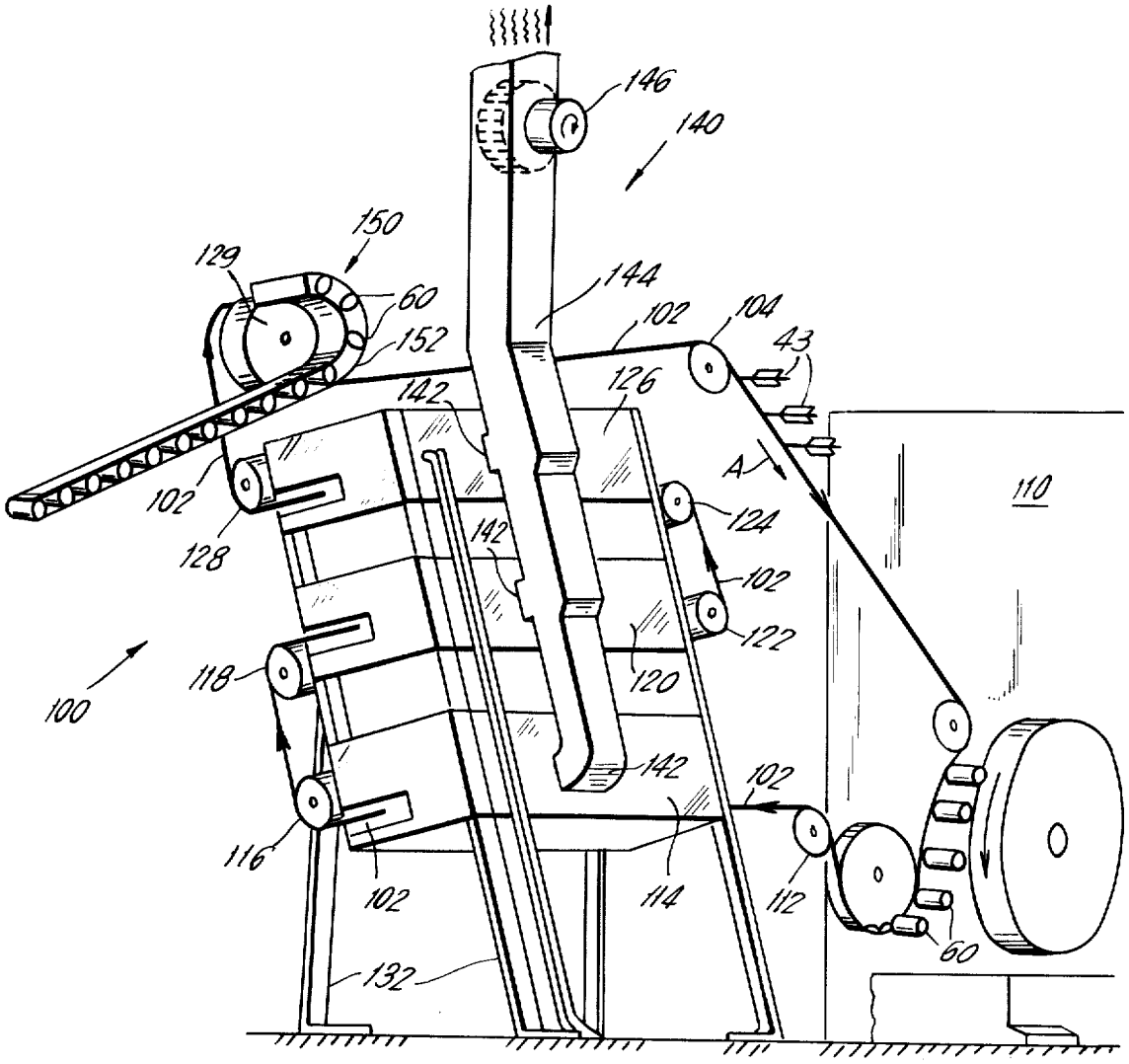
FIG. 6 is a schematic perspective view of a modified embodiment of curing apparatus in accordance with the invention.

In curing apparatus 10 illustrated in FIGS. 1-3, there is a single curing oven 70. In certain situations, it may be impractical to provide a single curing oven of sufficient length to fully cure the coating on the object or the application of radiation for curing should be periodically halted. In FIGS. 6 and 7, an object or can curing apparatus 100 is illustrated. Apparatus 100 basically differs from apparatus 10 in the provision of a plurality of ovens.

In apparatus 100, in place of chain 20, a longer continuous chain 102 is provided. Chain 102 passes around idler 104, and the empty can supports 43 carried thereon enter can coating apparatus 110 wherein cans are mounted upon supports 43 and are then decorated in the manner taught in Application Ser. No. 198,618, filed Nov. 15, 1971. Fuller details of coating apparatus 110 can be obtained from the aforesaid application.

From apparatus 110, the cans and their chain 102 are directed by idler 112 through curing oven 114. Oven 114 is similar in every respect to oven 70 of apparatus 10. Chain 102 exits from oven 114 and passes around idlers 116, 118 into and through second oven 120, which is identical to oven 114 except for changes required due to the direction of movement of the cans through oven 120. Chain 102 exits from oven 120 and passes around idlers 112, 124 and into and through third oven 126, which is identical to oven 114. From oven 126, chain 102 passes around idlers 128, 129 and then continues toward idler 104.

Ovens 114, 120 and 126 are supported in their stacked position by supports 132. As shown in FIG. 7, the ovens are tilted from the upright to minimize the possibility that any can 60 might slip off its support 43, which possibility exists with rigid supports, for example.

As with apparatus 10, apparatus 100 includes means for exhausting ozone and heated gases developed within each of the ovens. Exhaust means 140 includes a respective exhaust duct 142 for each oven and a common exhaust collection duct 144 connected with exhaustion means 146.

At idler 129, cans 60 enter can stripper 150 which includes means, e.g. conventional suction, compressed air or mechanical means (not shown) for removing the cans from their supports 43. The now free cans move through chute 152 to be delivered to a subsequent use apparatus, at which the cans might be filled, for example.

The vertical stack of ovens illustrated in FIGS. 6 and 7 is not the only plural oven arrangement which might be used. Alternative vertical and horizontal arrangements are schematically illustrated in FIGS. 8-10. Still other arrangements are available. In any alternative arrangement, the operations will be substantially the same as those described in connection with FIGS. 6 and 7.

Although the present invention has been described in connection with preferred embodiments thereof, many other variations and modifications will now become apparent to those skilled in the art. It is preferred, therefore, that the present invention be limited not by the specific disclosure herein, but only by the appended claims.

I claim:

1. Apparatus for curing a solvent-free coating on the peripheral surfaces of an object, comprising:

a curing oven having an entrance and an exit and a path therebetween; a radiation lamp supported in said oven and positioned to direct curing radiation across said oven and across said path therein;

at least one mandrel for supporting an object; mandrel moving means connected with said mandrel for moving it to guide the object supported by said mandrel, through said oven along said path therein;

mandrel rotating means connectable with the mandrel and positioned to continuously engage and continuously rotate said mandrel and the object as the object passes through said oven on said path therein; said mandrel rotating means comprising a rack means orientedd generally parallel to said path; and a wheel supported by said mandrel; said rack means being positioned such that said mandrel wheel continuously engages said rack as the object supported by said mandrel passes through said oven.

2. The apparatus for curing a coating of claim 1, wherein said path has a predetermined length for the portion thereof while radiation is impinging upon the object; said rack means has a length at least as long as said path portion.

3. The apparatus for curing a coating of claim 2, wherein said lamp is supported away from said path and is in a plane spaced from the axis of rotation of the object as it moves along said path.

4. The apparatus for curing a coating of claim 3, wherein said lamp is oriented obliquely with respect to said path and the axis of the object so that as the object moves along said path, the radiation from the lamp moves along the axis of the object.

5. The apparatus for curing a coating of claim 1, wherein the object is hollow and includes an opening to receive said mandrel; said mandrel includes a rigid object support shaped and positioned to fit into an opening in the hollow object.

6. The apparatus for curing a coating of claim 1, wherein said object support comprises a plurality of resilient fingers supported on said mandrel and deflectable with respect thereto.

7. The apparatus for curing a coating of claim 1, further comprising a plurality of said mandrels all connected with and movable by said mandrel moving means, thereby to move the objects through said oven in succession.

8. The apparatus for curing a coating of claim 4, wherein the object is hollow and includes an opening to receive said mandrel; said mandrel includes a resilient, outwardly biased object support which is resiliently deflectable to enable said object support to fit into an opening in the object and to be biased outwardly to engage and support the object on said mandrel.

9. Apparatus for curing a solvent free coating on the peripheral surfaces of an object, comprising:

a curing oven having an entrance and an exit and a path therebetween; a radiation lamp supported in said oven and positioned to direct curing radiation across said oven and across said path therein; said lamp being elongated along a straight axis;

object moving means connected with said object for moving it to guide the object through said oven along said path therein;

rotating means connectable with the object and positioned to rotate the object as it passes through said oven on said path therein; the axis of rotation of said object being generally peripendicualar to the direction of said path;

said lamp being supported away from said path and being disposed in a plane spaced from and parallel to the axis of rotation of the object as it moves along said path; said lamp axis being oriented obliquely with respect to said path and extending along said path so that as the object moves along said path, the radiation from the lamp moves along the axis of the object.

10. The apparatus for curing a coating of claim 9, wherein said object rotating means comprises a rack means oriented generally parallel to said path; and a wheel supported by said mandrel; said path has a predetermined length for the portion thereof while radiation is impinging upon the object; said rack means has a length at least as long as said path portion; said rack means being positioned such that said mandrel wheel continuously engages said rack as the object supported by said mandrel passes through said oven.

11. The apparatus for curing coating of claim 10, wherein said oven is an enclosed housing with said entrance and said exit being openings thereinto;

said rack means being positioned externally of said oven housing; each said mandrel including an object support for supporting an object, which said support is in said housing as said support moves along said path; each said mandrel wheel being exterior of said housing; said housing having a slot parallel to said path for permitting movement of said mandrel along said path.

12. The apparatus for curing a coating of claim 10, wherein said lamp is supported away from said path and in a plane spaced from the axis of rotation of said object as it moves along said path.

13. The apparatus for curing a coating of claim 11, which comprises a plurality of said ovens each having the characteristics of the said oven; said ovens being so positioned that said entrance of one said oven is spaced a distance from said exit of the preceding said oven;

said mandrel moving means being so shaped and positioned as to move said mandrels successively through said ovens from their respective said entrances through their respective said exits.

*14. Apparatus for curing inks and decorative coatings on containers comprising*

*a. a conveyor having container rotating means on which decorated containers are mounted for rotation while being carried by the conveyor,*

*b. means for rotating said container rotating means, and*

*c. an ultra violet light assembly including a longitudinally extending lamp tube and reflector, said assembly extending at an oblique angle to the path of travel of the conveyor for beaming a band of concentrated ultra violet light on the rotated containers while the containers move past the light assembly, the angle at which the assembly extends relatively to the path of travel of the conveyor being determined by the axial length of the containers such that each container receives bands of ultra violet light in helical pattern progressively from end to end of the container body while it is carried by the conveyor past the assembly.*

*15. The apparatus defined by claim 14, in which the containers are externally decorative with ultra violet sensitive inks or coatings.*

*16. The apparatus defined by claim 14, in which the conveyor is a peg-chain type conveyor, each peg comprising a pin extending at a right angle to the chain of the conveyor, and a sleeve of yieldable material rotatably mounted on the pin and frictionally engaging the interior of the container body.*

*17. The apparatus defined by claim 16, in which the containers have cylindrical bodies closed at one end and open at the other end, and the said pegs enter the containers through said open ends.*

* * * * *